March 18, 1952 G. D. WILLITS 2,590,058
MOTOR SWITCH ASSEMBLY
Filed June 27, 1950
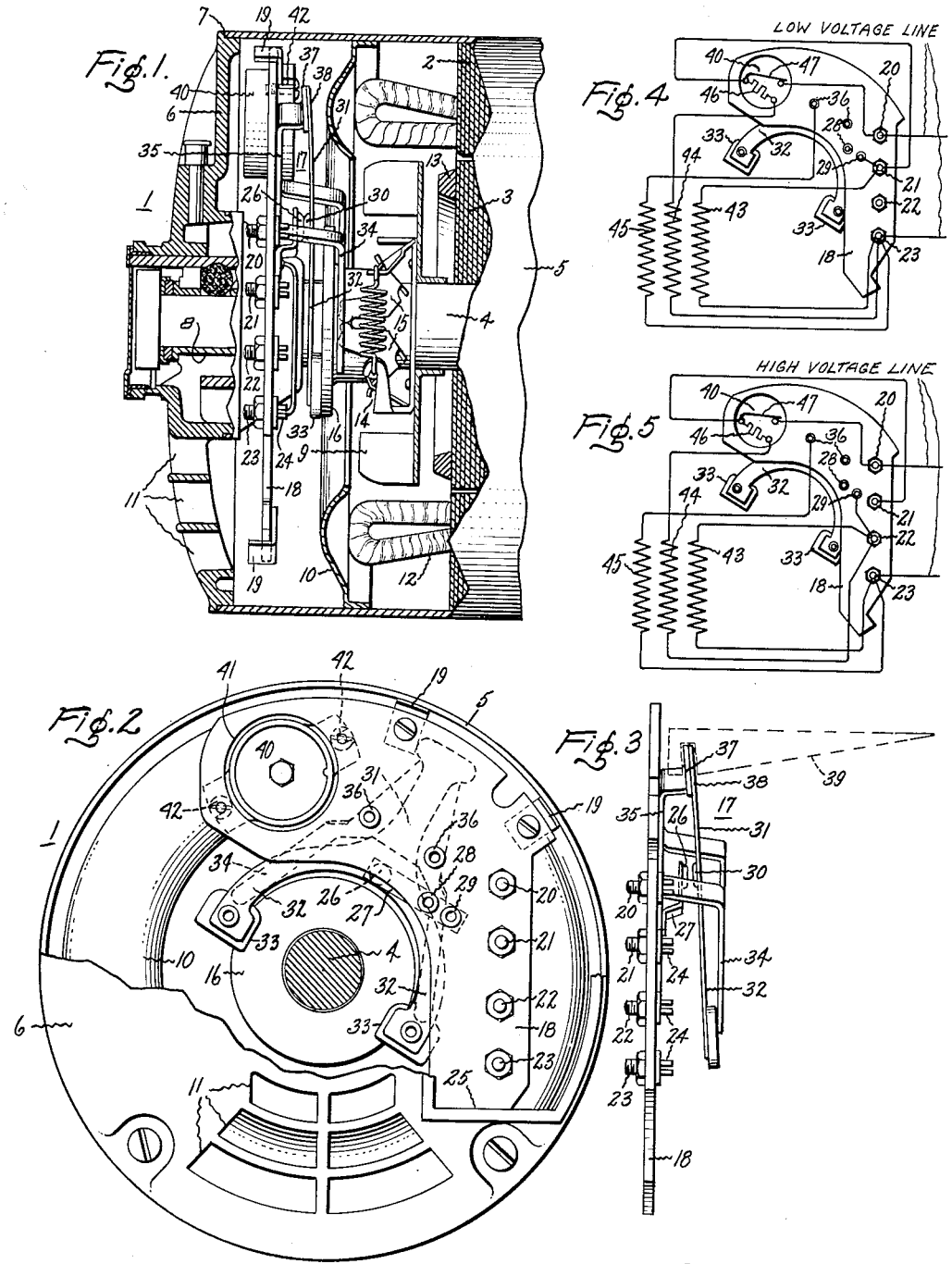
Inventor
Glenn D. Willits
by Ernest C. Britton
His Attorney Patented Mar. 18, 1952

2,590,058

UNITED STATES PATENT OFFICE 2,590,058

MOTOR SWITCH ASSEMBLY

Glenn D. Willits, Leo, Ind., assignor to General Electric Company, a corporation of New York Application June 27, 1950, Serial No. 170,635

4 Claims. (Cl. 171—252)

This invention relates to switch assemblies for dynamoelectric machines and more particularly to switch assemblies of the type generally employed for controlling the circuits of starting windings of single phase induction motors.

In the design of dynamoelectric machines, particularly single phase induction motors, a switch is frequently employed to disconnect a starting winding in response to actuation by a speed responsive device when the motor has come up to speed. Such switches have been commonly constructed with the switch elements mounted on an insulating supporting member to which the terminal studs for internal and external connections are also secured. This combination terminal board and supporting member for the switch is conventionally mounted in an end shield of the motor which necessitates relatively long leads to the motor windings which must be disconnected from the terminal board when the motor is disassembled. Furthermore, motors of the type here considered are frequently provided with thermal overload devices for which mounting means must be furnished. In addition, in the design of the switch itself, it has been found that the pressure applied by the movable element of the switch on the speed responsive device is of great importance relative to the correct cut-out speed.

An object of this invention is to provide an improved switch assembly for a dynamoelectric machine.

Another object of this invention is to provide an improved starting switch and overload assembly for a dynamoelectric machine.

A further object of this invention is to provide an improved starting switch and overload assembly for a dynamoelectric machine which is mounted in the shell of the machine, eliminating the disconnection of leads when the machine is disassembled.

Yet another object of this invention is to provide an improved switch assembly for a dynamoelectric machine having means for readily adjusting the movable element.

Further objects and advantages of this invention will become apparent and the invention will be better understood from the following description referring to the accompanying drawing, and the features of novelty which characterize this invention will be pointed out with particularity in the claims annexed to and forming a part of this specification.

In accordance with this invention, there is provided a starting and overload switch assembly which comprises a mounting and terminal board member formed of insulating material positioned within and secured to the shell of the machine. A plurality of terminal studs are secured to the board and are provided with interior portions for connection to the windings of the machine and exterior portions accessible to the exterior of the machine through an opening in the end shield for making external connections. A stationary switch contact is secured to the board and a movable contact is provided cooperating with the stationary contact and adapted to be actuated by a speed responsive device on the shaft of the machine. The stationary and movable contacts are adapted to be connected in circuit between the starting circuit of the machine and one of the terminal studs. An overload device is also secured to the mounting board and is adapted to be connected in circuit between the appropriate windings of the machine and one of the terminal studs. This arrangement of the starting switch, terminal board and overload on a common mounting board positioned within the shell of the machine permits the use of relatively short leads between the windings and the terminal studs and eliminates the necessity of disconnecting these leads when the end shield of the machine is removed. The switch itself is constructed with a substantially U-shaped mounting member having a portion secured to the supporting member and arms projecting therefrom. The U-shaped member has another portion remote from the arms which is spaced from the supporting member. A flexible element of conductive material is provided having one end secured to the spaced portion of the mounting member and arms extending therefrom. The movable contact is mounted on the flexible element to cooperate with the stationary contact which is mounted on the supporting member and the arms of the U-shaped member are arranged to form limit stops for the free ends of the arms of the flexible element, these free ends being arranged for actuation by a speed responsive device on the shaft of the machine. The end of the flexible element which is secured to the spaced portion of the mounting member is movable to provide for ready adjustment of the contacts and the pressure applied to the speed responsive device.

In the drawing, Fig. 1 is a side elevational view, partly in section, of an end of a single phase induction motor provided with the improved starting switch and overload assembly of this invention; Fig. 2 is an end view, partly in section, further illustrating the improved starting switch and overload assembly of Fig. 1; Fig. 3 in a detailed view of the improved switch of this invention; and Figs. 4 and 5 illustrate the utilization of the improved starting switch and overload assembly of this invention in the circuit of a dual voltage motor.

Referring now to Figs. 1 and 2, there is shown a single phase induction motor 1 having a stationary core member 2 and a rotor member 3 mounted on a shaft 4. The stationary core member 2 is mounted in a cylindrical shell member 5 and end shield 6 is provided having a suitable rabbet connection with the shell member 5, as at 7. The end shield 6 is formed with a bearing 8 therein, for rotatably supporting the shaft 4. A fan 9 is mounted on the shaft 4 and a baffle member 10 is mounted within the shell member 5. Openings 11 are formed in the end shield 6 and ventilating air is drawn by the fan 9 through these openings around the baffle member 10 and then blown over the end turns 12 through openings in the shell member 5 (not shown). The rotatable member 3 is shown as being provided with a cast squirrel cage winding 13 of any suitable conventional type.

In single phase induction motors, other than the shaded pole type, one or more main or running windings are provided together with a starting winding physically and electrically displaced from the main windings. Thus, energization of these two windings when the motor is started provides two phase starting flux. It is desirable, however, that this starting winding be de-energized when the speed of the motor exceeds a predetermined value. In order to accomplish this object, a speed responsive device 14 is provided mounted on the shaft 4. This is shown as being a centrifugal mechanism of the type described in Patent 2,149,108 of A. F. Welch assigned to the assignee of this application. This centrifugal mechanism includes a pair of weights 15 adapted to react under centrifugal force at a predetermined speed to move push-collar 16 axially on the shaft 4 for controlling the operation of the contacts of the switch 17, now to be described.

The improved switch and overload assembly of this invention includes a supporting mounting and terminal board member 18 formed of a suitable insulating material, such as fiberboard. The supporting member 18 is positioned within the shell member 5 and is secured thereto by a plurality of mounting lugs 19. Terminal studs 20, 21, 22 and 23 are secured to the supporting member 18 adjacent one end thereof with their interior portions 24 extending toward the stationary core member 2. The end shield member 6 is provided with an opening 25 therein communicating with the terminal studs 20 through 23 inclusive so that their exterior portions are accessible to the exterior of the machine for making the necessary external connections. As will be hereinafter described, the arrangement of the switch and terminal board assembly 17 within the shell member 5 permits the utilization of relatively short leads between the field windings and the terminal studs and eliminates the necessity for disconnecting these leads in order to remove the end shield.

The switch itself is mounted adjacent the center of the terminal board and includes a substantially stationary contact 26 mounted on a supporting member 27 secured by suitable hollow rivets 28 and 29 to the support 18. The stationary contact 26 is thus adapted to be electrically connected to one terminal of the motor starting winding as will be hereinafter described. A movable contact 30 is supported on a flexible member 31 formed of electrically conductive material. The flexible member 31 is formed with a pair of arms 32 and a pair of wear pads 33 are respectively provided on the free ends thereof. These wear pads are adapted to engage the push-collar 16 of the centrifugal mechanism 14 for moving the movable contact 30 towards the stationary contact 26. The flexible member 31 is sufficiently resilient and is suitably biased, as will be hereinafter described, so that when the centrifugal weights 15 move outwardly to draw the push-collar 16 towards the right, as shown in Fig. 1, the wear pads 33 will follow the movement of the collar and carry the movable contact 30 out of engagement with the stationary contact 26, thereby breaking the electrical circuit therebetween. In order to prevent undue wear in movement of the flexible supporting member 31, a mounting stop member is provided having arms 34 which limit the outward movement of the wear pads 33 and of the flexible member 31. The mounting member is provided with a base portion 35 secured to the supporting member 18 by hollow rivets 36 and an end portion 37 spaced from the supporting member 18. The flexible member 31 has an end 38 secured to the spaced portion 37 of the mounting member, in any suitable manner, as by brazing. It has been found that the pressure applied by the wear pads 33 against the face of the push-collar 16 is of great importance relative to the correct cut-out speed. The mounting of the flexible member 31 on the spaced portion 37 of the mounting member permits the use of an adjusting tool, as shown in dashed lines 39 in Fig. 3, to move the end 37 of the flexible member 31 in order to bias this member to secure the proper pressure of the wear pads 33 on the push-collar 16 and the proper adjustment of the contacts 26 and 30.

In addition to carrying the switch assembly 17 and terminal studs 20 through 23 inclusive, the supporting member 18 also carries an overload device 40 adjacent the other end thereof. The overload device 40 is arranged in a suitable opening 41 in the supporting member 18, as by screws 42. As will hereinafter be described, the overload device 40 is thus adapted to be connected in circuit between the windings of the motor and one of the terminal studs.

Referring now to Fig. 4, there is shown a circuit utilizing the improved switch and overload assembly of this invention for a high voltage connection. Here, the motor is provided with main or running windings 43 and 44 and a starting winding 45. As will be readily seen, one side of the starting winding 45 is connected to rivet 36 which in turn is associated with the movable contact 30. The stationary contact 26 is associated with rivet 29 which in this connection is connected to terminal stud 21. The other side of the starting winding 45 is connected to terminal stud 23. The overload device 40 comprises a bimetallic element 47 and a heating element 46. In this connection, the bimetallic element 47 is connected across the terminal studs 20 and 21 and the heating element 46 is connected in series with running winding 44. One end of the other running winding 43 is connected to terminal stud 21 and both free ends of the running windings 43 and 44 are connected to terminal stud 23. It will now be readily seen that in this low voltage connection, the running windings 43 and 44 and the starting winding 45 are arranged in parallel across the external line which is connected to the terminal studs 20 and 23. Thus, all the windings have a common connection to terminal stud 23 and one side of the external line and all the windings are connected to the other side of the line through terminal 20 and bimetallic element 47 of the overload 40. Starting winding 45 has the switch contacts additionally arranged in series therewith and running winding 44 has the heating element 46 arranged in series therewith. Inspection of Fig. 5 which is the high voltage connection will indicate that the running windings 43 and 44 are arranged in series and that the starting winding 45 is arranged in parallel with the running winding 43. In this connection, therefore, starting with one side of the line at the terminal 20, the circuit includes serially the bimetallic element 47, the heating element 46, the running winding 45, and then the running winding 43 and starting winding 45 in parallel, their free ends being both connected to the other side of the line through terminal 23. The contacts of the switch are, of course, arranged in series with the starting winding 45. In this arrangement, the terminal stud 21 is free and the common ends of the running windings 43 and 44 are connected to the terminal stud 22. The rivet 29 is also connected to the terminal stud 22, thereby connecting the stationary contact thereto and the rivet 36 associated with the movable contact is connected to the other side of the starting winding 45.

It will now be readily apparent that this invention provides a greatly improved starting switch and overload assembly wherein all elements requiring connection to the windings are conventionally mounted on a common supporting member which in turn is mounted within the motor shell permitting short leads to the windings and eliminating the necessity of disconnecting these leads when the end shield is removed. Furthermore, the switch itself is constructed so as to provide for ready adjustment of the wear pad pressure and the contacts.

While I have illustrated and described a particular embodiment of this invention, modifications thereof will occur to those skilled in the art. I desire it to be understood, therefore, that my invention is not limited to the particular arrangement disclosed and I intend in the appended claims to cover all modifications which do not depart from the spirit and scope of this invention.

What I claim as new and desire to secure by Letters Patent of the United States is:

1. In a motor having an enclosing shell member and an end shield member cooperating therewith having an opening formed therein, a starting switch and overload assembly comprising a mounting and terminal board member formed of insulating material positioned within and secured to said shell member, a plurality of terminal studs secured to said board adjacent one end thereof and having interior portions for connection to the windings of said motor and exterior portions accessible to the exterior of said motor through said end shield opening for making external connections to said motor, a starting switch mounted on said board adjacent the center thereof, including a stationary switch contact secured to said board, and a movable switch contact adapted to be actuated by a speed responsive device on the shaft of said motor cooperating with said stationary contact, said stationary and movable contacts being adapted to be connected in circuit between the starting circuit of said motor and one of said terminal studs, and an overload element secured to said board adjacent the other end thereof adapted to be connected in circuit between the windings of said machine and one of said terminal studs.

2. In a motor, a starting switch assembly comprising a support formed of insulating material, a stationary contact secured to said support, a substantially U-shaped mounting member having a portion secured to said support and arms projecting therefrom, said mounting member having another portion remote from said arms and spaced from said support, a flexible element of conducting material having one end secured to said other portion of said mounting member and having arms extending therefrom, and a movable contact mounted on said flexible element and cooperating with said stationary contact, said arms of said U-shaped member being arranged to form limit stops for the free ends of said arms of said flexible element, said arms of said flexible element being adapted to be actuated by a speed-responsive device on the shaft of said motor whereby said contacts are opened and closed, said one end of said flexible element being movable to provide for adjustment of said contacts.

3. In a motor, a starting switch assembly comprising a support formed of insulating material, a stationary contact secured to said support, a substantially U-shaped mounting member having a portion secured to said support and arms projecting therefrom, said mounting member having another portion remote from said arms and spaced from said support, a flexible element of electrically conductive material having one end secured to said other portion of said mounting member and having arms extending therefrom, a movable contact mounted on said flexible element and cooperating with said stationary contact, wear pads secured to the free ends of said arms of said flexible element, said arms of said mounting member being arranged to engage an edge of said wear pads to provide limit stops for said free ends of said arms of said flexible element, said wear pads being adapted to be actuated by a speed-responsive device on the shaft of said motor whereby said contacts are opened and closed, said one end of said flexible element being movable to provide for adjustment of said contacts and the pressure applied by said wear pads on said speed-responsive device.

4. In a motor having an enclosing shell member and an end shield member cooperating therewith having an opening formed therein, a starting switch and overload assembly comprising a supporting and terminal board member formed of insulating material positioned within and secured to said shell member, a plurality of terminal studs secured to said board adjacent one end thereof and having interior portions for connection to the windings of said motor and exterior portions accessible to the exterior of said motor through said end shield opening for making external connections to said motor, a starting switch mounted on said board adjacent the center thereof including a stationary contact secured to said board, a substantially U-shaped mounting member having a portion secured to said board and arms projecting therefrom, said mounting member having another portion remote from said arms and spaced from said support, a flexible element of conducting material having one end secured to said other portion of said mounting member and having arms extending therefrom, and a movable contact mounted on said flexible element and cooperating with said stationary contact, said arms of said U-shaped member being arranged to form limit stops for the free ends of said arms of said flexible element, said arms of said flexible element being adapted to be actuated by a speed-responsive device on the shaft of said motor whereby said contacts are opened and closed, said one end of said flexible element being movable to provide for adjustment of said contacts, said stationary and movable contacts being adapted to be connected in the circuit between the starting circuit of said motor and one of said terminal studs, and an overload element secured to said board adjacent the other end thereof adapted to be connected in circuit between the windings of said motor and one of said terminal studs.

GLENN D. WILLITS.

REFERENCES CITED

The following references are of record in the file of this patent:

UNITED STATES PATENTS

| Number | Name | Date |
|---|---|---|
| 2,057,527 | Horning | Oct. 13, 1936 |
| 2,180,022 | Streck | Nov. 14, 1939 |
| 2,305,093 | Leflar et al. | Dec. 15, 1942 |
| 2,442,227 | Willits | May 25, 1948 |
| 2,463,020 | Coe et al. | Mar. 1, 1949 |